UNITED STATES PATENT OFFICE.

CHARLES E. ACKER, OF NIAGARA FALLS, NEW YORK.

PROCESS OF DETINNING.

No. 855,491.          Specification of Letters Patent.          Patented June 4, 1907.

Application filed February 5, 1907. Serial No. 355,840.

*To all whom it may concern:*

Be it known that I, CHARLES E. ACKER, a citizen of the United States, residing at Niagara Falls, in the county of Niagara and State of New York, have invented certain new and useful Improvements in Processes of Detinning, of which the following is a specification.

Tin-scrap is a material of such great bulk that it is commercially expedient to compress it before subjecting it to the action of detinning reagents. The interstices of compressed scrap, however, are so narrow that the reagent does not readily penetrate them and the speed of the reaction is apt to be slow and the removal of tin incomplete. According to the present process, the reagent is subjected to increased pressure during detinning and is thereby forced into the narrowest interstices of the scrap.

In carrying out the process, the tin-scrap, mechanically compressed so as to occupy a relatively small space, is treated in a reaction vessel, for example a steel drum or tank with a tight cover, of sufficient size to contain several tons of the material under treatment. The detinning reagent may be an elementary gas or gas mixture, for example, chlorin, bromin, or a mixture of either of these gases with other gases or air; a solution of an elementary gas in a liquid, for example, chlorin in carbon tetrachlorid or stannic chlorid; or a gaseous or liquid compound, for example a chlorin compound in which the chlorin is loosely bound, such as bromin chlorid. In some cases different portions of the body of scrap in the vessel may be simultaneously subjected to the action of a liquid and a gaseous reagent, the lower part of the vessel, only, containing a liquid in which the scrap is partially submerged.

During the detinning, the pressure in the vessel is raised, for example by pumping in chlorin. If a gaseous reagent is employed, the air normally in the vessel will act as an inert diluent. It is preferred, however, to initially exhaust the air from the vessel containing the compressed scrap. The reagent, subjected to atmospheric or preferably super-atmospheric pressure, will then quickly penetrate all the interstices of the scrap.

When the scrap is completely detinned, the gaseous or liquid products of reaction are discharged, the pressure being decreased to or below atmospheric, and the residual metal is removed and is preferably washed, in succession, with water and a dilute alkali solution, as usual in the art. In some cases the pressure in the vessel is successively decreased and increased during the detinning and is then again decreased. For example, the vessel may first be exhausted, the pressure then increased to or above atmospheric, and the final decrease of pressure effected either by venting super-atmospheric pressure or by again producing a partial vacuum within the vessel, such vacuum assisting the removal of the products of reaction.

I claim:

1. The process of detinning, which consists in subjecting compressed tin scrap to the action of a detinning reagent, and forcing the reagent into the interstices of the scrap by varying the pressure during the detinning.

2. The process of detinning, which consists in subjecting compressed tin-scrap to the action of a detinning reagent, and forcing the reagent into the interstices of the scrap by pressure increased during the detinning.

3. The process of detinning, which consists in subjecting compressed tin-scrap to the action of a detinning reagent, and forcing the reagent into the interstices of the scrap by superatmospheric pressure.

4. The process of detinning, which consists in subjecting compressed tin-scrap in a closed vessel to the action of a detinning reagent, and increasing the pressure in the vessel during the detinning.

5. The process of detinning, which consists in subjecting compressed tin-scrap in a closed vessel to the action of a detinning reagent, increasing the pressure in the vessel during the detinning, and then decreasing the pressure.

6. The process of detinning, which consists in subjecting compressed tin-scrap in a closed vessel to the action of a detinning reagent, and successively decreasing and increasing the pressure in the vessel during the detinning.

7. The process of detinning, which consists in subjecting compressed tin-scrap in a closed vessel to the action of a detinning reagent, successively decreasing and increasing the pressure in the vessel during the detinning, and again decreasing the pressure.

In testimony whereof, I affix my signature in presence of two witnesses.

CHARLES E. ACKER.

Witnesses:
    GEO. O. SEWARD,
    GEO. F. SEWARD.